(12) United States Patent
Peng et al.

(10) Patent No.: US 12,483,490 B2
(45) Date of Patent: Nov. 25, 2025

(54) METHOD FOR GENERATING DETECTION POLICY, DEVICE, AND SYSTEM

(71) Applicant: HUAWEI TECHNOLOGIES CO., LTD., Guangdong (CN)

(72) Inventors: Tao Peng, Nanjing (CN); Zhouyi Yu, Beijing (CN); Rongrong Hua, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

(21) Appl. No.: 18/533,027

(22) Filed: Dec. 7, 2023

(65) Prior Publication Data

US 2024/0106727 A1    Mar. 28, 2024

Related U.S. Application Data

(63) Continuation of application No. PCT/CN2022/096173, filed on May 31, 2022.

(30) Foreign Application Priority Data

Jun. 8, 2021    (CN) .......................... 202110639244.4

(51) Int. Cl.
| | |
|---|---|
| *H04L 12/24* | (2006.01) |
| *H04L 12/713* | (2013.01) |
| *H04L 29/06* | (2006.01) |
| *H04L 41/12* | (2022.01) |
| *H04L 43/08* | (2022.01) |

(52) U.S. Cl.
CPC .............. *H04L 43/08* (2013.01); *H04L 41/12* (2013.01)

(58) Field of Classification Search
CPC ......... H04L 43/08; H04L 41/12; H04L 12/24; H04L 12/713; H04L 29/06
USPC .......................................................... 709/224
See application file for complete search history.

(56) References Cited

U.S. PATENT DOCUMENTS

| | | | |
|---|---|---|---|
| 9,479,409 B2 | 10/2016 | Zhang et al. | |
| 9,961,686 B2 * | 5/2018 | Andreoli-Fang | H04W 72/51 |
| 10,244,032 B2 * | 3/2019 | Rao | H04L 47/20 |
| 10,644,994 B1 * | 5/2020 | Judge | H04L 45/7453 |

(Continued)

FOREIGN PATENT DOCUMENTS

| | | |
|---|---|---|
| EP | 3605956 A1 | 2/2020 |
| EP | 3627765 A1 | 3/2020 |

OTHER PUBLICATIONS

Extended European Search Report in European Appln. No. 22819410.6, mailed on Oct. 10, 2024, 16 pages.

*Primary Examiner* — Jude Jean Gilles
(74) *Attorney, Agent, or Firm* — Fish & Richardson P.C.

(57) ABSTRACT

This application relates to methods, devices, and systems for generating a detection policy. An example method can be applied to a controller. In the example method, the controller obtains path information, where the path information includes information about a first network device, and the first network device belongs to a network device through which a packet passes from a source end to a destination end. The controller generates a detection policy for a second network device based on the path information and delivers the detection policy to the second network device, where the second network device is the same as or different from the first network device.

16 Claims, 7 Drawing Sheets

(56) References Cited

U.S. PATENT DOCUMENTS

| | | | |
|---|---|---|---|
| 2013/0142046 A1* | 6/2013 | Zhou | H04L 41/0896 370/230 |
| 2015/0036495 A1* | 2/2015 | Venkatachalam | H04W 88/16 370/235 |
| 2015/0381493 A1* | 12/2015 | Bansal | H04L 45/30 370/392 |
| 2016/0285729 A1 | 9/2016 | Chinthalapati et al. | |
| 2017/0093681 A1* | 3/2017 | Chaubey | H04L 41/0806 |
| 2017/0250945 A1* | 8/2017 | Wadhwa | H04L 45/66 |
| 2018/0133507 A1* | 5/2018 | Malchano | A61N 1/36082 |
| 2020/0229040 A1* | 7/2020 | Sun | H04L 43/55 |

* cited by examiner

METHOD FOR GENERATING DETECTION POLICY, DEVICE, AND SYSTEM

CROSS-REFERENCE TO RELATED APPLICATIONS

This application is a continuation of International Application No. PCT/CN2022/096173, filed on May 31, 2022, which claims priority to Chinese Patent Application No. 202110639244.4, filed on Jun. 8, 2021. The disclosures of the aforementioned applications are hereby incorporated by reference in their entireties.

TECHNICAL FIELD

This application relates to the detection field, and in particular, to a method for generating a detection policy, a device, and a system.

BACKGROUND

Existing traffic detection technologies are mainly classified into out-band (out-band) detection and in-band (in-band) detection. For the out-band detection technology, a detection flow and a data flow are separated from each other. For the in-band detection, a detection flow and a data flow are integrated with each other. An example in which the in-band detection is an in-situ flow information telemetry (in-situ flow information telemetry, IFIT) solution is used. Detection information may be carried in a packet of the data flow. By detecting a network performance indicator, a subtle anomaly in a network may be identified, and performance information such as a delay and a packet loss in the network is precisely detected. In cooperation with millisecond-level data collection, real-time network quality is visualized and faults are quickly demarcated and located.

However, the IFIT cannot automatically configure a detection policy as required, resulting in low detection efficiency.

SUMMARY

To resolve the foregoing problem, this application provides a method for generating a detection policy, a device, and a system, to effectively improve detection efficiency.

According to a first aspect, a method for generating a detection policy is provided, applied to a software defined network SDN controller, and the method includes:

The SDN controller obtains path information, where the path information includes information about a first network device, and the first network device belongs to a network device through which a packet passes from a source end to a destination end.

The SDN controller generates a detection policy for a second network device based on the path information, and delivers the detection policy to the second network device, where the second network device is the same as or different from the first network device.

In the foregoing solution, the SDN controller may obtain the information about the first network device, to automatically configure the detection policy for the second network device based on the information about the first network device, to effectively improve detection efficiency.

In some possible designs, the second network device is different from the first network device, and the method further includes:

The SDN controller determines information about the second network device based on the information about the first network device.

In the foregoing solution, the information about the second network device may be inferred based on the information about the first network device, to generate the detection policy for the second network device.

In some possible designs, the second network device is different from the first network device, and the path information further includes information about the second network device.

In the foregoing solution, the information about the first network device and the information about the second network device may be obtained, and the detection policy is generated for the second network device by using more detailed information.

In some possible designs, that the SDN controller obtains path information includes:

The SDN controller receives the path information sent from a broadband network gateway control plane BNG-CP device.

In some possible designs, the source end is connected to a spine node via a first leaf node, the spine node is connected to a second leaf node, the second leaf node is connected to the destination end, the destination end is a broadband network gateway user plane BNG-UP device, and the first network device is the first leaf node.

In some possible designs, the BNG-CP device is connected to a user plane selection function UPSF, the UPSF is connected to the SDN controller, and that the SDN controller obtains path information includes:

The SDN controller receives the path information sent by the BNG-CP device via the UPSF.

In some possible designs, the source end is connected to at least one intermediate network device via an SF device, one network device in the at least one intermediate network device is connected to the destination end, the destination end is a BNG-UP, and the path information includes information about the SF device.

In some possible designs, the path information further includes one or more of the following: a MAC address of user equipment, a private internet protocol IP address of the user equipment, and a public IP address and a port of the user equipment.

In some possible designs, the path information is carried in a detection request, and that the SDN controller obtains path information includes: The SDN controller receives the detection request sent by the BNG-CP device, and obtains the path information based on the detection request.

In the foregoing solution, the detection request may be triggered via the BNG-CP device.

In some possible designs, that the SDN controller obtains path information includes:

The SDN controller receives a configuration command, where the configuration command includes information about first user equipment.

The SDN controller sends a query request to the BNG-CP device based on the information about the first user equipment.

The SDN controller receives the path information returned by the BNG-CP device based on the query request, where the path information corresponds to the first user equipment.

In the foregoing solution, a user may trigger the detection request by controlling the SDN controller.

According to a second aspect, a method for generating a detection policy is provided, applied to a BNG-CP device, and the method includes:

The BNG-CP device sends path information to an SDN controller, where the path information includes information about a first network device, and the first network device belongs to a network device through which a packet passes from a source end to a destination end.

In some possible designs, the path information further includes information about a second network device, and the second network device is different from the first network device.

In some possible designs, that the BNG-CP device sends path information to an SDN controller includes:

The BNG-CP device sends the path information to the SDN controller through a direct connection interface between the BNG-CP device and the SDN controller.

In some possible designs, the source end is connected to a spine node via a first leaf node, the spine node is connected to a second leaf node, the second leaf node is connected to the destination end, the destination end is a BNG-UP device, and the first network device is the first leaf node.

In some possible designs, that the BNG-CP device sends path information to an SDN controller includes: The BNG-CP device sends the path information to the SDN controller via a UP SF.

In some possible designs, the BNG-CP device is connected to the UPSF, and the UPSF is connected to the SDN controller.

In some possible designs, the source end is connected to at least one intermediate network device via an SF device, one network device in the at least one intermediate network device is connected to the destination end, the destination end is a BNG-UP device, and the path information includes information about the SF device.

In some possible designs, the path information further includes one or more of the following: a MAC address of user equipment, an IP address of the user equipment, and a public IP address and a port of the user equipment.

In some possible designs, that the BNG-CP device sends path information to an SDN controller includes:

The BNG-CP device sends a detection request to the SDN controller, where the path information is carried in the detection request.

In some possible designs, before that the BNG-CP device sends path information to an SDN controller, the method includes: The BNG-CP device receives a query request sent by the SDN controller, where the query request carries information about first user equipment.

That the BNG-CP device sends path information to an SDN controller includes: The BNG-CP device returns the path information to the SDN controller based on the query request, where the path information corresponds to the first user equipment.

According to a third aspect, an SDN controller is provided, including an obtaining module and a generation module.

The obtaining module is configured to obtain path information, where the path information includes information about a first network device, and the first network device belongs to a network device through which a packet passes from a source end to a destination end.

The generation module is configured to: generate a detection policy for a second network device based on the path information, and deliver the detection policy to the second network device, where the second network device is the same as or different from the first network device.

In some possible designs, the second network device is different from the first network device, and the controller further includes a determining module.

The determining module is configured to determine information about the second network device based on the information about the first network device.

In some possible designs, the second network device is different from the first network device, and the path information further includes information about the second network device.

In some possible designs, the obtaining module is further configured to receive the path information sent from a BNG-CP device.

In some possible designs, the source end is connected to a spine node via a first leaf node, the spine node is connected to a second leaf node, the second leaf node is connected to the destination end, the destination end is a BNG-UP device, and the first network device is the first leaf node.

In some possible designs, the BNG-CP device is connected to a UPSF, the UPSF is connected to the SDN controller, and the obtaining module is further configured to receive the path information sent by the BNG-CP device via the UPSF.

In some possible designs, the source end is connected to at least one intermediate network device via an SF device, one network device in the at least one intermediate network device is connected to the destination end, the destination end is a BNG-UP device, and the path information includes information about the SF device.

In some possible designs, the path information further includes one or more of the following: a MAC address of user equipment, an IP address of the user equipment, and a public IP address and a port of the user equipment.

In some possible designs, the path information is carried in a detection request, and the obtaining module is specifically configured to: receive the detection request sent by the BNG-CP device, and obtain the path information based on the detection request.

In some possible designs, the obtaining module is specifically configured to: receive a configuration command, where the configuration command includes information about first user equipment; send a query request to the BNG-CP device based on the information about the first user equipment; and receive the path information returned by the BNG-CP device based on the query request, where the path information corresponds to the first user equipment.

According to a fourth aspect, a broadband network gateway control plane BNG-CP device is provided. The BNG-CP device includes a sending module. The sending module sends path information to an SDN controller, where the path information includes information about a first network device, and the first network device belongs to a network device through which a packet passes from a source end to a destination end.

In some possible designs, the path information further includes information about a second network device, and the second network device is different from the first network device.

In some possible designs, the sending module is specifically configured to send the path information to the SDN controller through a direct connection interface between the BNG-CP device and the SDN controller.

In some possible designs, the source end is connected to a spine node via a first leaf node, the spine node is connected to a second leaf node, the second leaf node is connected to the destination end, the destination end is a BNG-UP device, and the first network device is the first leaf node.

In some possible designs, the sending module is specifically configured to send the path information to the SDN controller via a UPSF.

In some possible designs, the BNG-CP device is connected to the UPSF, and the UPSF is connected to the SDN controller.

In some possible designs, the source end is connected to at least one intermediate network device via an SF device, one network device in the at least one intermediate network device is connected to the destination end, the destination end is a BNG-UP device, and the path information includes information about the SF device.

In some possible designs, the path information further includes one or more of the following: a MAC address of user equipment, an IP address of the user equipment, and a public IP address and a port of the user equipment.

In some possible designs, that the BNG-CP device sends path information to the SDN controller includes: The sending module is specifically configured to send a detection request to the SDN controller, where the path information is carried in the detection request.

In some possible designs, the BNG-CP device further includes a receiving module. The receiving module is configured to receive a query request sent by the SDN controller, where the query request carries information about first user equipment. The sending module is specifically configured to return the path information to the SDN controller based on the query request, where the path information corresponds to the first user equipment.

According to a fifth aspect, a network device is provided, including a processor and a memory, where the processor executes code in the memory to enable the network device to perform the method according to any one of the first aspect or the second aspect.

According to a sixth aspect, a communication system is provided, including an SDN controller and a BNG-CP device, where the SDN controller and the BNG-CP device may communicate with each other.

The SDN controller is configured to perform the method according to the first aspect.

The BNG-CP device is configured to perform the method according to the second aspect.

According to a seventh aspect, a network device readable storage medium is provided, including instructions, where when the instructions are run on a network device, the network device is enabled to perform the method according to any one of the first aspect or the second aspect.

BRIEF DESCRIPTION OF DRAWINGS

To describe the technical solutions in embodiments of this application or in the background more clearly, the following describes the accompanying drawings for describing embodiments of this application or the background.

DESCRIPTION OF EMBODIMENTS

A software defined network (software defined network, SDN) is an implementation of network virtualization. A core technology openflow of the software defined network separates a control plane of a network device from a data plane of the network device, to implement flexible control of network traffic, and enable a network to be more intelligent as a pipe. An SDN controller has characteristics of forwarding and control separation, centralized control, and an open interface. The forwarding and control separation means that a control plane is set on the controller, a forwarding plane is set on the network device, the controller generates a flow table, the controller sends the flow table to the network device, and the network device forwards data based on the flow table. The centralized control means that the controller manages and delivers the flow table in a centralized manner. The open interface means that a third-party application only needs to define a new network function in a programming manner through the open interface provided by the controller, and then runs the new network function on the controller.

Network function virtualization (network function virtualization, NFV) uses software and hardware decoupling and function abstraction to enable network device functions independent on dedicated hardware, achieving full and flexible sharing of resources and fast development and deployment of new services. The network function virtualization also supports automatic deployment, flexible scaling, fault isolation, and self-healing based on service requirements. The network device may include a BNG, a firewall, and the like.

It can be learned that the SDN implements decoupling between the control plane and the forwarding plane, and the NFV implements decoupling between the software and the hardware. Therefore, the SDN and the NFV have a natural complementary relationship, and jointly implement flexible network deployment.

In an SDN/NFV architecture, the BNG implements decoupling between the control plane and the forwarding plane and decoupling between the software and the hardware. The BNG is a broadband access gateway device, and is mainly used for user authentication, access control, traffic scheduling, and the like.

Figure 1:
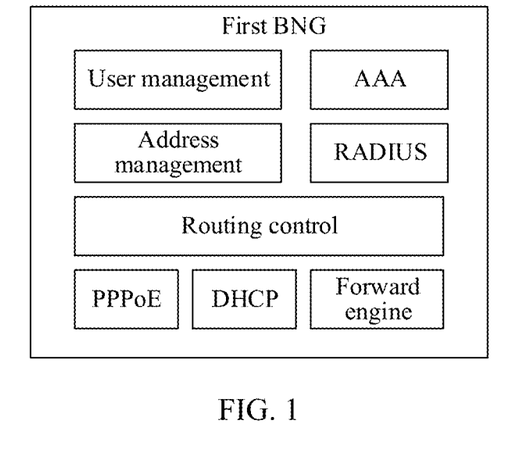
FIG. 1 is a schematic structural diagram of a broadband network gateway (broadband network gateway, BNG) according to this application.

Before decoupling between the control plane and the forwarding plane and decoupling between the software and the hardware are implemented, as shown in FIG. 1, a first BNG may include user management (user management, UM), authentication, authorization, and accounting (authentication, authorization, and accounting, AAA), address management (address management, AM), a remote authentication dial-in user service (Remote Authentication Dial-In User Service, RADIUS), routing control (routing control), a point-to-point protocol over Ethernet (point-to-point protocol over Ethernet, PPPoE), a dynamic host configuration protocol (dynamic host configuration protocol, DHCP), and a forward engine (forward engine).

Figure 2:
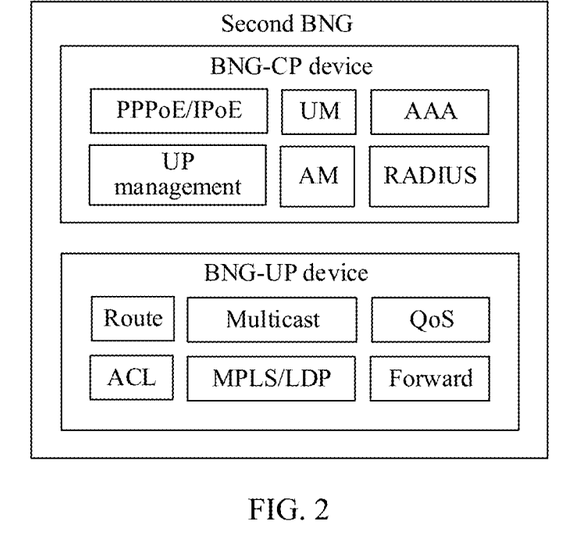
FIG. 2 is a schematic structural diagram of another broadband network gateway (broadband network gateway, BNG) according to this application.

After decoupling between the control plane and the forwarding plane and decoupling between the software and the hardware are implemented, as shown in FIG. 2, a second BNG is divided into two parts: a BNG-control plane (control plane, CP) and a BNG-user plane (user plane, UP). A BNG-CP device includes a PPPoE/an IP over Ethernet (IP over Ethernet, IPoE), UM, authentication, AAA, UP management, AM, and a RADIUS. The BNG-UP device includes routing (routing), multicast (multicast), quality of service (quality of service, QoS), an access control list (access control list, ACL), multiprotocol label switching (multiprotocol label switching, MPLS)/a label distribution protocol (label distribution protocol, LDP), and forwarding (forwarding).

When the BNG uses the second BNG shown in FIG. 2, a communication system in this application may include a plurality of network devices, for example, an optical network terminal (optical network terminal, ONT), an optical line terminal (optical line terminal, OLT), an SDN controller, a plurality of routers, a BNG-CP device, a BNG-UP device, and a RADIUS.

The ONT is a very end unit of fiber to the home (Fiber to the Home, FTTH), also known as an optical modem. The ONT belongs to an optical network unit (optical network unit, ONU).

The OLT is an optical line terminal, and a central office device of telecom. The OLT is configured to connect optical fiber trunks and functions as a switch or a router in a traditional communication network. The OLT is a device at an entrance of an external network and an entrance and an exit of an internal network. Main functions of the OLT are traffic scheduling, buffer control, and providing a user-oriented passive optical network interface, and bandwidth allocation. That is, the OLT implements two functions: for an upstream, the OLT completes uplink access of a passive optical network (passive optical network, PON); and for a downstream, the OLT sends and distributes obtained data to all ONUS via an optical distribution network (optical distribution network, ODN).

The SDN controller is a "brain" of a network and a strategic control point in an SDN network. The SDN controller manages traffic control of a switch/a router on the "bottom" (through a southbound API) and an application and service logic on the "top" (through a northbound API) to deploy an intelligent network.

The router is a device that connects a local area network and a wide area network over Internet. The router automatically selects and sets routing based on a channel status, and sends a signal in sequence through a best path. A plurality of routers may form a spine-leaf (Spine-Leaf) network topology, that is, the plurality of routers may include a spine node and a leaf node. In addition, the plurality of routers may further include an access router (access router, AR), a border router (border router, BR), a core router (core router, CR) and the like. The plurality of routers may include an SF router, a P router, and the like.

For details of the BNG-CP device, the BNG-UP device, and the RADIUS, refer to FIG. 2 and related descriptions. Details are not described herein again.

Figure 3:
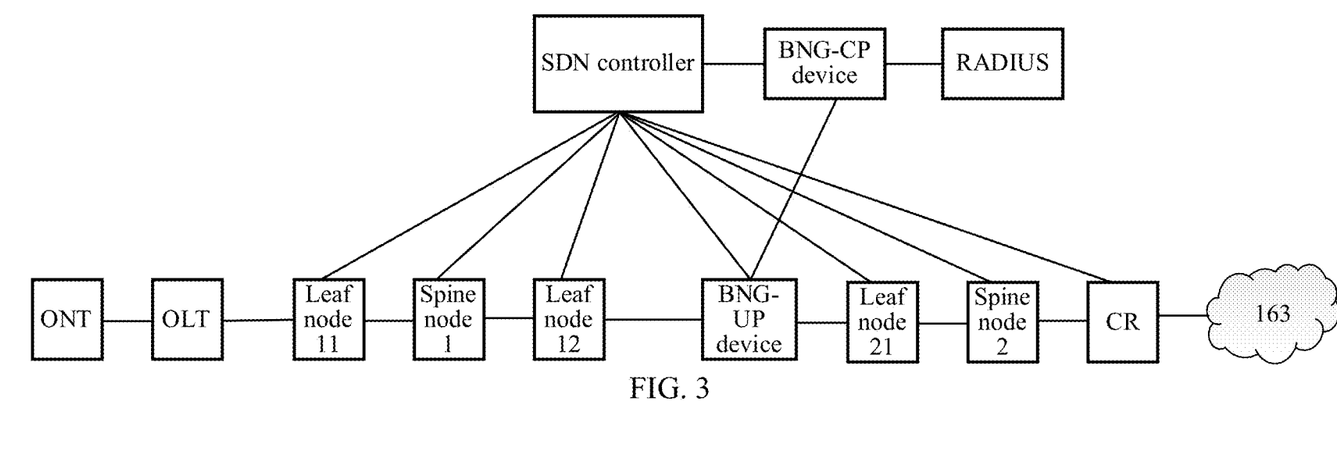
FIG. 3 is a schematic structural diagram of a communication system according to this application.

In a specific embodiment, as shown in FIG. 3, a communication system in this application is based on a new metropolitan area network. A specific architecture of the new metropolitan area network may be as follows: A source end is an OLT, and a destination end is a BNG-UP device. A spine-leaf network topology is set between the OLT and the BNG-UP device, to be specific, the OLT is connected to a spine node 1 via a leaf node 11, and the spine node 1 is connected to a leaf node 12. A spine-leaf network topology is also set between the BNG-UP device and a CR, to be specific, the BNG-UP device is connected to a leaf node 21, the leaf node 21 is connected to a spine node 2, and the spine node 2 is connected to the CR. The BNG-UP device is connected to a BNG-CP device, and the BNG-CP device is connected to an SDN controller and a RADIUS.

Figure 4:
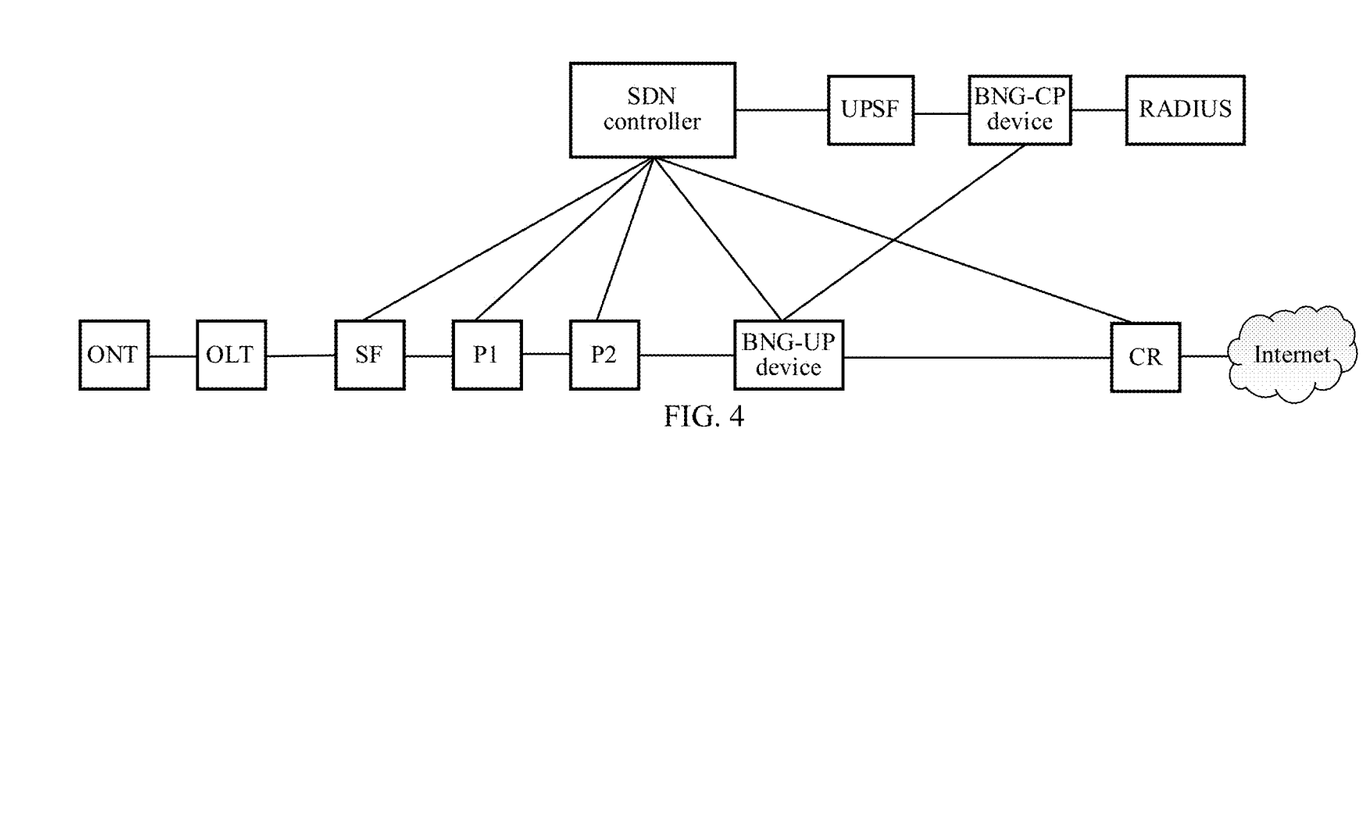
FIG. 4 is a schematic structural diagram of another communication system according to this application.

In a specific embodiment, as shown in FIG. 4, a communication system in this application is based on a home broadband user network. A specific architecture of the home broadband user network may be as follows: A source end is an OLT, and a destination end is a BNG-UP device. A plurality of intermediate network devices, for example, an SF router and a plurality of P routers, are disposed between the OLT and the BNG-UP device. That is, the OLT is connected to a P router 1 via the SF router, the P router 1 is connected to a P router 2, and the P router 2 is connected to the BNG-UP device. No router is disposed between the BNG-UP device and a CR. The BNG-UP device is connected to a BNG-CP device, the BNG-CP device is separately connected to a user plane selection function (user plane selection function, UPSF) and a RADIUS, and the UPSF is connected to an SDN controller.

When the IFIT technology is used for detection, the SDN controller may generate a detection policy, and then deliver the detection policy to a plurality of routers to start end-to-end or hop-by-hop detection. The plurality of routers perform the detection according to the detection policy to obtain a plurality of detection results. The plurality of routers respectively send the detection result to the SDN controller, and the SDN controller collects the detection result sent by each router, to implement service quality awareness and fault demarcation. However, because the SDN controller cannot learn of a forwarding path of a packet, when determining the detection policy, the SDN controller cannot automatically execute the detection policy for specific user equipment based on a requirement, resulting in low detection efficiency.

To resolve the foregoing problem, this application provides a method for generating a detection policy, to learn of a forwarding path of a packet, and further automatically execute the detection policy for specific user equipment and improve detection efficiency.

Figure 5:
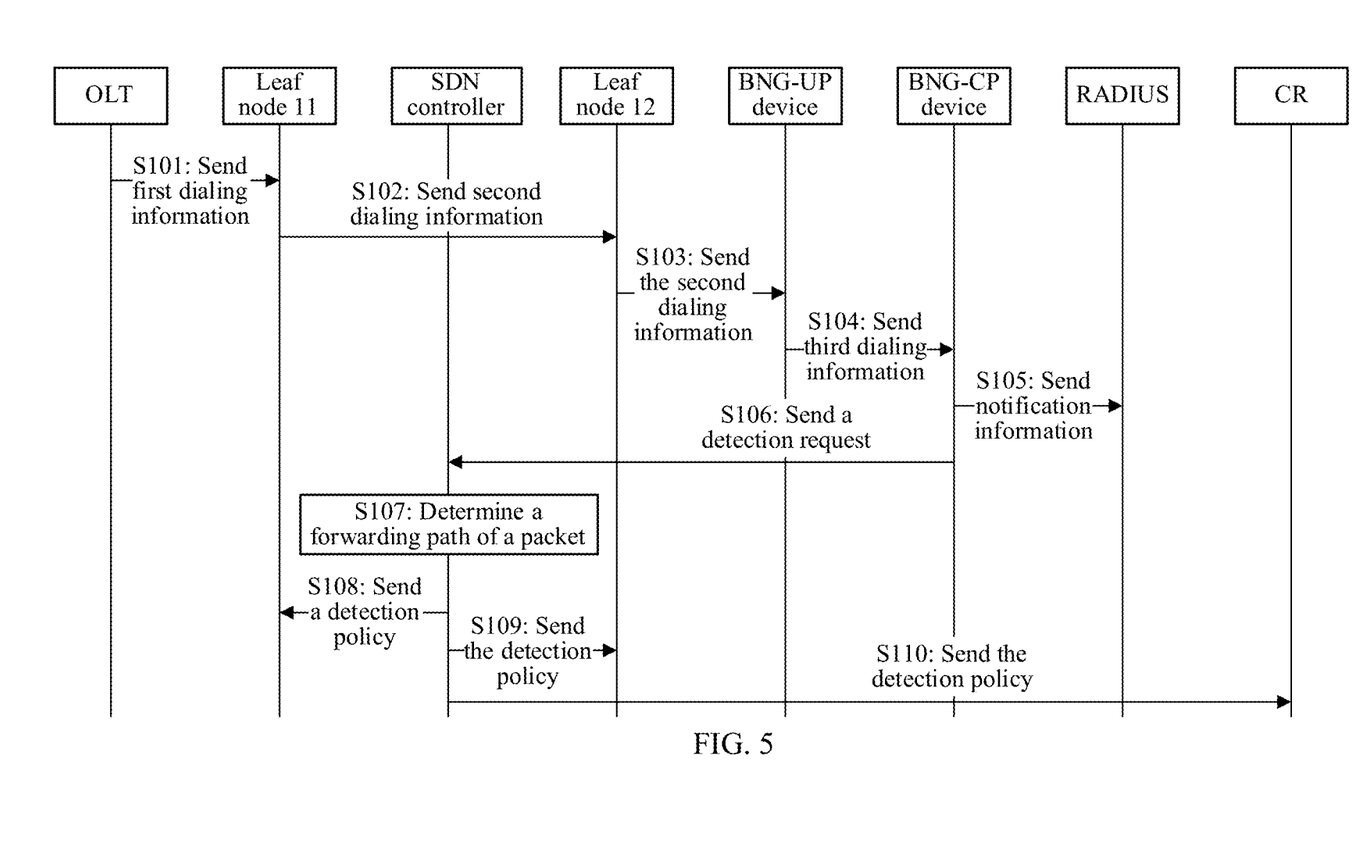
FIG. 5 is a schematic flowchart of a first method for generating a detection policy according to this application.

FIG. 5 is a schematic flowchart of a first method for generating a detection policy according to this application. The method for generating the detection policy in this implementation is based on the detection system shown in FIG. 3. As shown in FIG. 5, the method for generating the detection policy in this embodiment may include the following steps.

S101: An OLT sends first dialing information to a leaf node 11. Correspondingly, the leaf node 11 receives the first dialing information sent by the OLT.

In a specific implementation, the first dialing information may include a media access control (media access control, MAC) virtual local area network (virtual local area Network, VLAN) of dialing equipment, a MAC address of user equipment, a private internet protocol (internet protocol, IP) address of the user equipment, a public IP address and a port of the user equipment, and the like.

S102: The leaf node 11 sends second dialing information to a leaf node 12. Correspondingly, the leaf node 12 receives the second dialing information sent by the leaf node 11.

In a specific implementation, the second dialing information may be generated by the leaf node 11 based on the first dialing information. Specifically, the second dialing information may be obtained by including information about the leaf node 11 and an identifier of the leaf node 11 in the first dialing information. The information about the leaf node 11 may be a device identifier of the leaf node, an accessed board, a sub-card, an interface number, and the like. The identifier of the leaf node 11 may be a unique identifier of the leaf node 11.

In a specific implementation, communication between the leaf node 11 and the leaf node 12 may be performed via a spine node 1. To be specific, after generating the second dialing information, the leaf node 11 sends the second dialing information to the spine node 1, and the spine node 1 sends the second dialing information to the leaf node 12.

S103: The leaf node 12 sends the second dialing information to a BNG-UP device. Correspondingly, the BNG-UP device receives the second dialing information sent by the leaf node 12.

S104: The BNG-UP device sends third dialing information to a BNG-CP device. Correspondingly, the BNG-CP device receives the third dialing information sent by the BNG-UP device.

In a specific implementation, the third dialing information may be generated by the BNG-UP device based on the second dialing information. Specifically, the third dialing information may be obtained by including a UP identifier and information about the BNG-UP device in the second dialing information. The UP identifier is a unique identifier of the BNG-UP device. The information about the BNG-UP device indicates a port that is in the leaf node 12 and that is connected to the BNG-UP device.

S105: The BNG-CP device sends notification information to a RADIUS. Correspondingly, the RADIUS receives the notification message sent by the BNG-CP device.

In a specific implementation, the notification information may include the UP identifier, a UP interface, the identifier of the leaf node 11, the information about the leaf node 11, and the like.

S106: The BNG-CP device sends a detection request to an SDN controller. Correspondingly, the SDN controller receives the detection request sent by the BNG-CP device.

In a specific implementation, the detection request may include path information, where the path information includes the MAC address of the user equipment, an IP address of the user equipment, the public IP address and the port of the user equipment, the information about the leaf node 11, the information about the BNG-UP device, and the like.

S107: The SDN controller determines a forwarding path of a packet based on the path information carried in the detection request, and generates a detection policy.

In a specific implementation, it is assumed that the forwarding path of the packet is: the OLT→the leaf node 11→the spine node 1→the leaf node 12→the BNG-UP device→a leaf node 21→a spine node 2→a CR. The SDN controller may determine the forwarding path of the packet in the following manner: The SDN controller may determine, based on the information about the leaf node 11, that the forwarding path of the packet passes through the leaf node 11. The SDN controller may determine, based on the information about the BNG-UP device, that the forwarding path of the packet passes through the leaf node 12. The SDN controller may determine, based on that the forwarding path of the packet passes through the leaf node 11 and the leaf node 12, that the forwarding path of the packet passes through the spine node 1. The reason why the SDN controller may determine, based on that the forwarding path of the packet passes through the BNG-UP device, that the forwarding path of the packet passes through the leaf node 21, the spine node 2, and the CR is that a network side interface of the BNG-UP device is fixed, and an accessed leaf node is also fixed. Therefore, after it is determined that the packet passes through the BNG-UP device, the packet inevitably passes through the leaf node 21, the spine node 2, and the CR. Therefore, the SDN controller may determine that the forwarding path of the packet is: the OLT→the leaf node 11→the spine node 1→the leaf node 12→the BNG-UP device→the leaf node 21→the spine node 2→the CR.

In a specific implementation, the detection policy may be an IFIT detection policy generated by the SDN controller for each forwarding node in the forwarding path of the packet.

In a specific implementation, the detection policy may be controlled based on the MAC address of the user equipment, may be detected based on the private IP address of the user equipment, or may be detected based on the public IP address and the port of the user equipment. For example, in the leaf node 11, the spine node 1, and the leaf node 12, the detection policy may be detected based on the MAC address of the user equipment and the private IP address of the user equipment, and in the leaf node 21 and the spine node 2, the detection policy may be detected based on the public IP address of the user equipment.

S108: The SDN controller sends the detection policy to the leaf node 11. Correspondingly, the leaf node 11 receives the detection policy sent by the SDN controller.

S109: The SDN controller sends the detection policy to the leaf node 12. Correspondingly, the leaf node 12 receives the detection policy sent by the SDN controller.

S110: The SDN controller sends the detection policy to the CR. Correspondingly, the CR receives the detection policy sent by the SDN controller.

Figure 6:
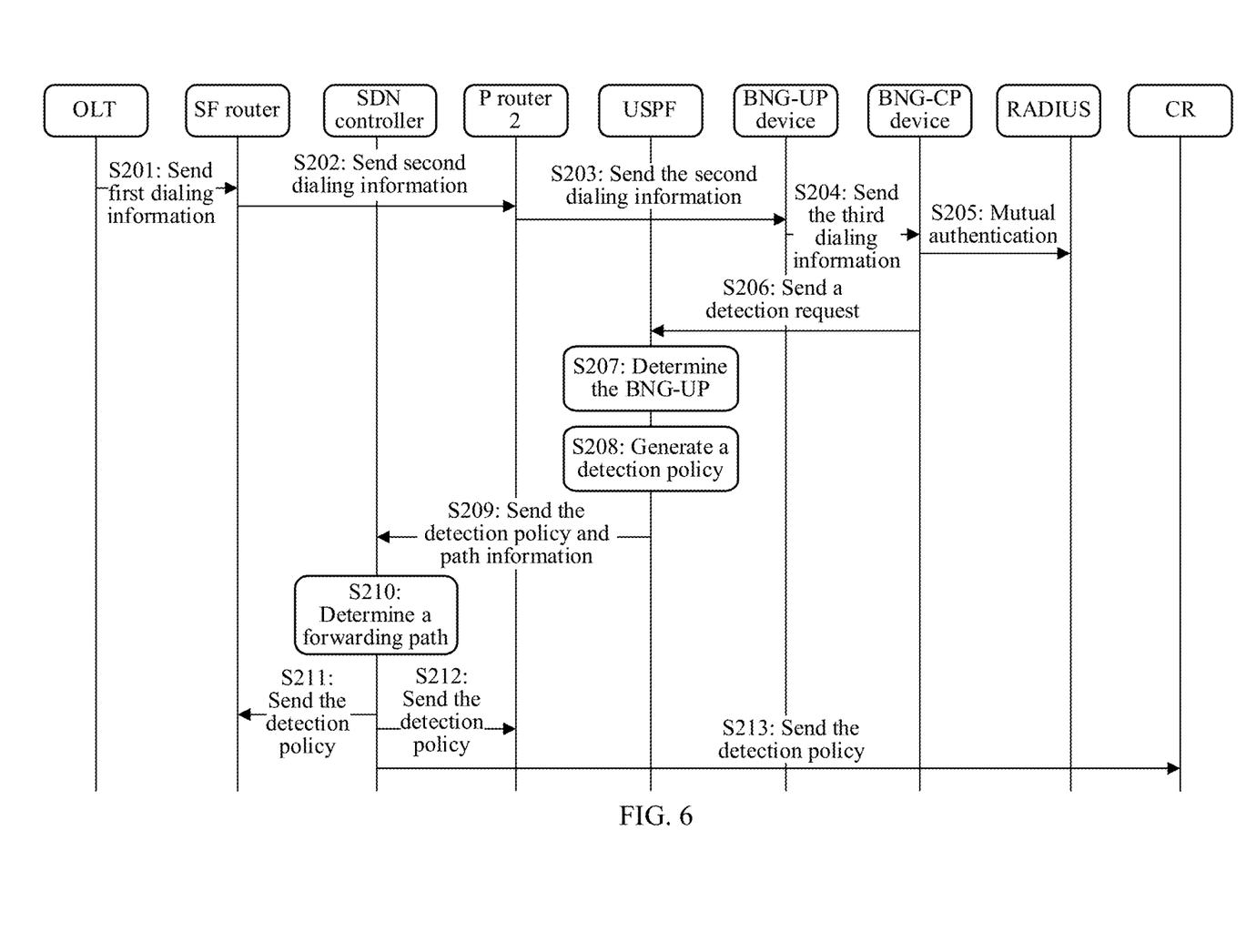
FIG. 6 is a schematic flowchart of a second method for generating a detection policy according to this application.

FIG. 6 is a schematic flowchart of a second method for generating a detection policy according to this application. The method for generating the detection policy in this implementation is based on the detection system shown in FIG. 4. As shown in FIG. 6, the method for generating the detection policy in this embodiment may include the following steps.

S201: An OLT sends first dialing information to an SF router. Correspondingly, the SF router receives the first dialing information sent by the OLT.

In a specific implementation, the first dialing information may include a MAC VLAN of dialing equipment, a MAC address of user equipment, an IP address of the user equipment, a public IP address and a port of the user equipment, and the like.

S202: The SF router sends second dialing information to a P router 2. Correspondingly, the P router 2 receives the second dialing information sent by the SF router.

In a specific implementation, the second dialing information may be generated by the SF router based on the first dialing information. Specifically, the second dialing information may be obtained by including information about the SF router and an identifier of the SF router in the first dialing information. The information about the SF router may be an SF device ID, an accessed board, a sub-card, an interface number, and the like. The identifier of the SF router may be a unique identifier of the SF router.

In a specific implementation, communication between the SF router and the P router 2 may be performed via a P router 1. To be specific, after generating the second dialing information, the SF router sends the second dialing information to the P router 1, and the P router 1 sends the second dialing information to the P router 2.

S203: The P router 2 sends the second dialing information to a BNG-UP device. Correspondingly, the BNG-UP device receives the second dialing information sent by the P router 2.

S204: The BNG-UP device sends third dialing information to a BNG-CP device. Correspondingly, the BNG-CP device receives the third dialing information sent by the BNG-UP device.

In a specific implementation, the third dialing information may be generated by the BNG-UP device based on the second dialing information. Specifically, the third dialing information may be obtained by including a UP identifier and UP information in the second dialing information. The UP identifier is a unique identifier of the BNG-UP device. The UP information indicates a port that is in the P router 2 and that is connected to the BNG-UP device.

S205: The BNG-CP device performs authentication with a RADIUS.

In a specific implementation, the BNG-CP device obtains a user SLA from the RADIUS.

S206: The BNG-CP device sends a detection request to a USPF. Correspondingly, the USPF receives the detection request sent by the BNG-CP device.

In a specific implementation, the detection request may include path information, where the path information may include the MAC address of the user equipment, the IP address of the user equipment, the public IP address and the port of the user equipment, the information about the SF router, the UP information, and the like.

S207: The USPF determines a target BNG-UP device.

In a specific implementation, the USPF may determine the target BNG-UP device based on network load and the user SLA. The network load may be based on session usage and bandwidth usage.

S208: The USPF generates a detection policy.

In a specific implementation, the detection policy may be an IFIT detection policy generated by the USPF for each forwarding node in a forwarding path of a packet.

In a specific implementation, the detection policy may be controlled based on the MAC address of the user equipment, may be detected based on a private IP address of the user equipment, or may be detected based on the public IP address and the port of the user equipment. For example, in the SF router, the P router 1, and the P router 2, the detection policy may be detected based on the MAC address of the user equipment and the private IP address of the user equipment, and in a CR, the detection policy may be detected based on the public IP address of the user equipment.

S209: The USPF sends the detection policy and the path information to an SDN controller. Correspondingly, the SDN controller receives the detection policy and the path information sent by the USPF.

In a specific implementation, the path information may include the MAC address of the user equipment, the IP address of the user equipment, the public IP address and the port of the user equipment, the information about the SF router, information about the BNG-UP device, and the like.

S210: The SDN controller determines the forwarding path of the packet based on the path information.

In a specific implementation, it is assumed that the forwarding path of the packet is: the OLT→the SF router-→the P router 1→the P router 2→the BNG-UP device→the CR. The SDN controller may determine the forwarding path of the packet in the following manner: The SDN controller may determine, based on the information about the SF router, that the forwarding path of the packet passes through the SF router. The SDN controller may determine, based on the information about the BNG-UP device, that the forwarding path of the packet passes through the P router 2. The SDN controller may determine, based on that the forwarding path of the packet passes through the SF router and the P router 2, that the forwarding path of the packet passes through the P router 1. The reason why the SDN controller may determine, based on that the forwarding path of the packet passes through the BNG-UP device, that the forwarding path of the packet passes through the CR is that a network side interface and the device are fixed. Therefore, after it is determined that the packet passes through the BNG-UP device, the packet inevitably passes through the CR. Therefore, the SDN controller may determine that the forwarding path of the packet is: the OLT→the SF router-→the P router 1→the P router 2→the BNG-UP device→the CR.

S211: The SDN controller sends the detection policy to the SF router. Correspondingly, the SF router receives the detection policy sent by the SDN controller.

S212: The SDN controller sends the detection policy to the P router 2. Correspondingly, the P router 2 receives the detection policy sent by the SDN controller.

S213: The SDN controller sends the detection policy to the CR. Correspondingly, the CR receives the detection policy sent by the SDN controller.

In the examples shown in FIG. 5 and FIG. 6, an example in which the BNG-CP device sends the detection request to the SDN controller to trigger generation of the detection policy is used for description. In actual application, alternatively, the SDN controller may send a query request to the BNG-CP device, where the query request carries information about first user equipment. The BNG-CP device returns the path information to the SDN controller based on the query request, where the path information corresponds to the first user equipment.

Figure 7:
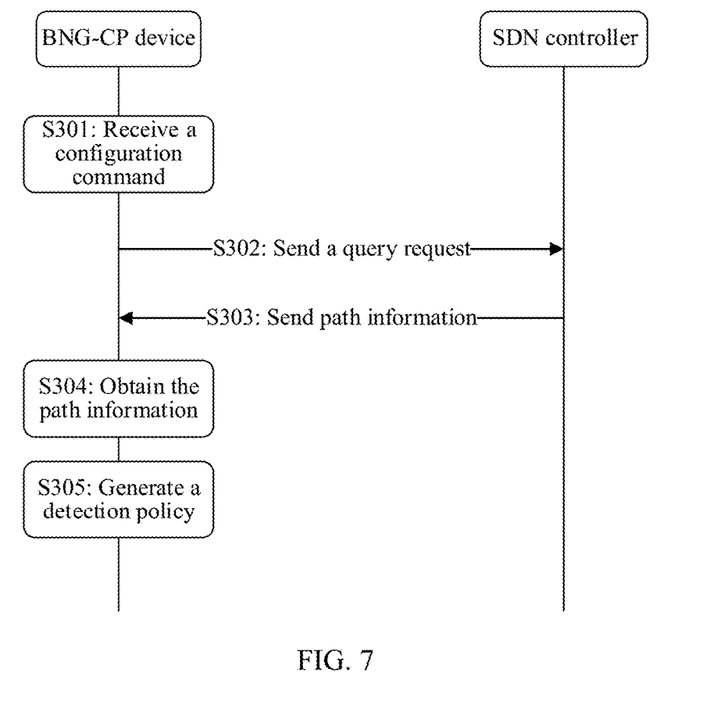
FIG. 7 is a schematic flowchart of a third method for generating a detection policy according to this application.

FIG. 7 is a schematic flowchart of a third method for generating a detection policy according to this application. As shown in FIG. 7, the method for generating the detection policy in this embodiment may include the following steps.

S301: A BNG-CP device receives a configuration command.

In a specific implementation, the configuration command includes information about first user equipment. The information about the first user equipment includes a MAC address of the first user equipment and the like.

In a specific implementation, the configuration command may be input by a user via an interface of the first user equipment, or may be input through a program interface.

S302: The BNG-CP device sends a query request to an SDN controller. Correspondingly, the SDN controller receives the query request sent by the BNG-CP device.

In a specific implementation, the query request carries the information about the first user equipment.

S303: The BNG-CP device returns path information to the SDN controller based on the query request. Correspondingly, the SDN controller receives the path information returned by the BNG-CP device.

In a specific implementation, the path information corresponds to the first user equipment.

In a specific implementation, the path information includes information about a first network device, or the path information includes the information about the first network device and information about a second network device, or the path information includes the information about the first network device, a MAC address of user equipment, an IP address of the user equipment, and a public IP address and a port of the user equipment, or the path information includes the information about the first network device, the information about the second network device, the MAC address of the user equipment, the IP address of the user equipment, the public IP address and the port of the user equipment, and the like.

In a specific implementation, the first network device may belong to a network device through which a packet passes from a source end to a destination end, and the second network device may belong to a network device through which the packet passes from the source end to the destination end, or may not belong to a network device through which the packet passes from the source end to the destination end.

In a specific implementation, the source end may be an ONU, an OLT, or the like.

In a specific implementation, the destination end may be a BNG-UP device, a CR, or the like.

In a specific implementation, when the BNG-CP device is directly connected to the SDN controller, the SDN controller receives, through a direct connection interface between the BNG-CP device and the SDN controller, the path information sent by the BNG-CP device.

In a specific implementation, when the BNG-CP device and the SDN controller are connected via a UPSF, to be specific, when the BNG-CP device is connected to the UPSF, and the UPSF is connected to the SDN controller, the SDN controller receives, via the UPSF, the path information sent from the BNG-CP device.

S304: The SDN controller obtains the path information.

S305: The SDN controller generates a detection policy for the second network device based on the path information, and delivers the detection policy to the second network device.

In a specific implementation, that the SDN controller generates a detection policy for the second network device based on the path information may include: The SDN controller may determine the information about the second network device based on the path information, and generate the detection policy for the second network device.

In a specific implementation, that the SDN controller generates a detection policy for the second network device based on the path information may include: The SDN controller generates the detection policy for the second network device based on the information about the first network device, where the second network device is the same as the first network device. The communication system shown in FIG. 3 is used as an example. A source end may be an OLT, and a destination end may be a BNG-UP device. The source end is connected to a spine node via a first leaf node, the spine node is connected to a second leaf node, and the second leaf node is connected to the destination end. In this case, the first network device may be one or more of the first leaf node (a leaf node 11), a first spine node (a spine node 1), and a second leaf node (a leaf node 12), and the second network device may be any one or more of the first leaf node (the leaf node 11), the first spine node (the spine node 1), and the second leaf node (the leaf node 12). To be specific, the SDN controller generates the detection policy based on that one or more of the first leaf node (the leaf node 11), the first spine node (the spine node 1), and the second leaf node (the leaf node 12) are any one or more of the first leaf node (the leaf node 11), the first spine node (the spine node 1), and the second leaf node (the leaf node 12). The communication system shown in FIG. 4 is used as an example. A source end may be an OLT, and a destination end may be a BNG-UP device. The source end is connected to at least one intermediate network device via an SF device, for example, an SF router, a P router 1, and a P router 2, and one network device in at least one intermediate network device is connected to the destination end. In this case, the first network device may be one or more of the SF router, the P router 1, and the P router 2, and the second network device may be one or more of the SF router, the P router 1, and the P router 2. To be specific, the SDN controller generates the detection policy based on that one or more of the SF router, the P router 1, and the P router 2 are one or more of the SF router, the P router 1, and the P router 2.

In a specific implementation, that the SDN controller generates a detection policy for the second network device based on the path information may include: The SDN controller generates the detection policy for the second network device based on the information about the first network device, where the second network device is different from the first network device. The communication system shown in FIG. 3 is used as an example. A source end may be an OLT, and a destination end may be a BNG-UP device. The source end is connected to a spine node via a first leaf node, the spine node is connected to a second leaf node, and the second leaf node is connected to the destination end. In this case, the first network device may be one or more of the first leaf node (a leaf node 11), a first spine node (a spine node 1), and the second leaf node (a leaf node 12), and the second network device may be any one or more of the BNG-UP device, a third leaf node (a leaf node 21), a second spine node (a spine node 2), and a CR. To be specific, the SDN controller generates the detection policy based on that one or more of the first leaf node (the leaf node 11), the first spine node (the spine node 1), and the second leaf node (the leaf node 12) are any one or more of the BNG-UP device, the third leaf node (the leaf node 21), the second spine node (the spine node 2), and the CR. The communication system shown in FIG. 4 is used as an example. A source end may be an OLT, and a destination end may be a BNG-UP device. The source end is connected to at least one intermediate network device via an SF device, for example, an SF router, a P router 1, and a P router 2, and one network device in the at least one intermediate network device is connected to the destination end. In this case, the first network device may be one or more of the SF router, the P router 1, and the P router 2, and the second network device may be one or more of the BNG-UP device and a CR. To be specific, the SDN controller generates a detection policy based on that one or more of the SF router, the P router 1, and the P router 2 are one or more of the BNG-UP device, and the CR.

In a specific implementation, that the SDN controller generates a detection policy for the second network device based on the path information may include: The SDN controller generates the detection policy for the second network device based on the information about the first network device, where the second network device is the same as or different from the first network device. The communication system shown in FIG. 3 is used as an example. A source end may be an OLT, and a destination end may be a BNG-UP device. The source end is connected to a spine node via a first leaf node, the spine node is connected to a second leaf node, and the second leaf node is connected to the destination end. In this case, the first network device may be one or more of the first leaf node (a leaf node 11), a first spine node (a spine node 1), and the second leaf node (a leaf node 12), and the second network device may be any one or more of the first leaf node (the leaf node 11), the first spine node (the spine node 1), the second leaf node (the leaf node 12), the BNG-UP device, a third leaf node (a leaf node 21), a second spine node (a spine node 2), and a CR. To be specific, the SDN controller generates a detection policy based on that one or more of the first leaf node (the leaf node 11), the first spine node (the spine node 1), and the second leaf node (the leaf node 12) are any one or more of the first leaf node (the leaf node 11), the first spine node (the spine node 1), and the second leaf node, (the leaf node 12), the BNG-UP device, the third leaf node (the leaf node 21), the second spine node (the spine node 2), and the CR. The communication system shown in FIG. 4 is used as an example. A source end may be an OLT, and a destination end may be a BNG-UP device. The source end is connected to at least one intermediate network device via an SF device, for example, an SF router, a P router 1, and a P router 2, and one network device in the at least one intermediate network device is connected to the destination end. In this case, the first network device may be one or more of the SF router, the P router 1, and the P router 2, and the second network device may be one or more of the SF router, the P router 1, the P router 2, the BNG-UP device, and a CR. To be specific, the SDN controller generates the detection policy based on that one or more of the SF router, the P router 1, and the P router 2 are one or more of the SF router, the P router 1, the P router 2, the BNG-UP device, and the CR.

In a specific implementation, that the SDN controller generates a detection policy for the second network device based on the path information may include: The SDN controller generates the detection policy for the second network device based on the information about the first network device and the information about the second network device, where the second network device is the same as or different from the first network device. The communication system shown in FIG. 3 is used as an example. A source end may be an OLT, and a destination end may be a BNG-UP device. The source end is connected to a spine node via a first leaf node, the spine node is connected to a second leaf node, and the second leaf node is connected to the destination end. In this case, the first network device may be one or more of the first leaf node (a leaf node 11), a first spine node (a spine node 1), and the second leaf node (a leaf node 12), and the second network device may be any one or more of the BNG-UP device, a third leaf node (a leaf node 21), a second spine node (a spine node 2), and a CR. To be specific, the SDN controller generates the detection policy based on one or more of the first leaf node (the leaf node 11), the first spine node (the spine node 1), and the second leaf node (the leaf node 12) and based on that any one or more of the BNG-UP device, the third leaf node (the leaf node 21), the second spine node (the spine node 2), and the CR are any one or more of the BNG-UP device, the third leaf node (the leaf node 21), the second spine node (spine node 2), the CR. The communication system shown in FIG. 4 is used as an example. A source end may be an OLT, and a destination end may be a BNG-UP device. The source end is connected to at least one intermediate network device via an SF device, for example, an SF router, a P router 1, and a P router 2, and one network device in the at least one intermediate network device is connected to the destination end. In this case, the first network device may be one or more of the SF router, the P router 1, and the P router 2, and the second network device may be one or more of the BNG-UP device and the CR. To be specific, the SDN controller generates the detection policy based on that one or more of the SF router, the P router 1, the P router 2, the BNG-UP device, and the CR are one or more of the BNG-UP device, and the CR.

In the example shown in FIG. 7, an example in which the SDN controller sends the query request to the BNG-CP device, and the BNG-CP device returns the path information to the SDN controller based on the query request is used for description. In actual application, alternatively, the BNG-CP device may send the detection request to the SDN controller to trigger generation of the detection policy. This is not specifically limited herein.

Figure 8:
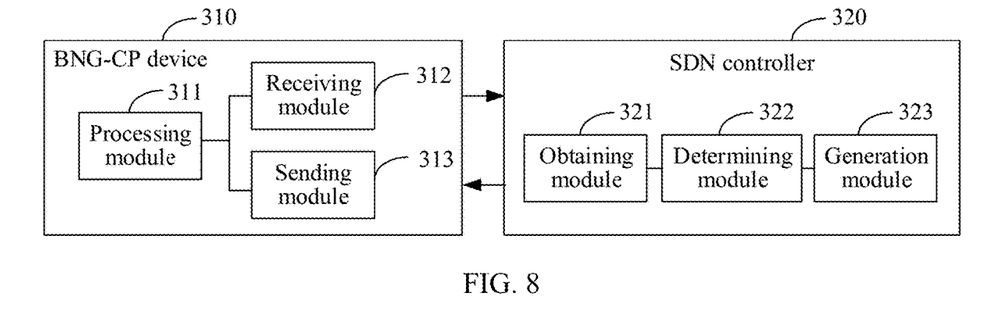
FIG. 8 is a schematic structural diagram of a communication system according to this application.

FIG. 8 is a schematic structural diagram of a communication system according to this application. As shown in FIG. 8, the communication system in this implementation includes a BNG-CP device 310 and an SDN controller 320. The BNG-CP device 310 and the SDN controller 320 may communicate with each other.

The BNG-CP device 310 may include a processing module 311, a receiving module 312, and a sending module 313.

The receiving module 312 is configured to receive a query request sent by the SDN controller, where the query request carries information about first user equipment.

The sending module 313 is specifically configured to return path information to the SDN controller based on the query request, where the path information corresponds to the first user equipment.

The SDN controller 320 may include an obtaining module 321, a determining module 322, and a generation module 323.

The obtaining module 321 is configured to obtain the path information, where the path information includes information about a first network device, and the first network device belongs to a network device through which a packet passes from a source end to a destination end.

The determining module 322 is configured to determine information about a second network device based on the information about the first network device.

The generation module 323 generates a detection policy for the second network device based on the information about the second network device, and delivers the detection policy to the second network device, where the second network device is the same as or different from the first network device.

For simplicity, definitions of the path information, the first network device, the second network device, the source end, the destination end, and the like are not described in detail in this embodiment. A manner in which the SDN controller receives the path information returned by the BNG-CP device and a manner in which the SDN controller generates the detection policy for the second network device based on the path information are not described in detail. For details, refer to FIG. 2 to FIG. 7 and related descriptions.

Figure 9:
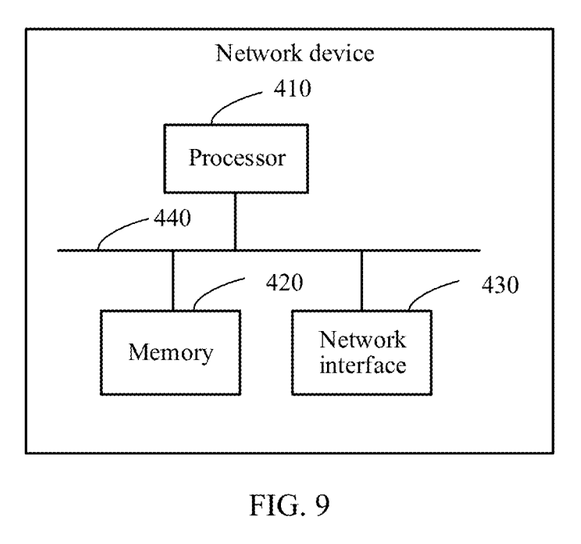
FIG. 9 is a schematic structural diagram of a network device according to this application.

FIG. 9 is a schematic structural diagram of a network device according to this application. The network device in this implementation may be an SDN controller or a BNG-UP device. As shown in FIG. 9, the network device in this implementation includes a processor 410, a memory 420, a network interface 430, and a bus 440.

The processor 410 includes one or more general-purpose processors. The general-purpose processor may be any type of device that can process electronic instructions, including a central processing unit (Central Processing Unit, CPU), a microprocessor, a microcontroller, a main processor, a controller, an application-specific integrated circuit (Application-Specific Integrated Circuit, ASIC), and the like. The general-purpose processor executes various types of digital storage instructions, for example, software or firmware programs stored in the memory 420. In a specific embodiment, the general-purpose processor may be an x86 processor or the like. The general-purpose processor sends a command to the memory 420 through a physical interface, to complete a storage-related task. For example, the command that can be provided by the general-purpose processor includes a read command, a write command, a copy command, an erase command, and the like. The command may specify an operation related to a specific page and block of the memory 420.

The memory 420 may include a random access memory (Random Access Memory, RAM), a flash memory (Flash Memory), or the like, or may be a RAM, a read-only memory (Read-Only Memory, ROM), a hard disk drive (Hard Disk Drive, HDD), or a solid-state drive (Solid-State Drive, SSD).

The network interface 430 is also referred to as a network interface controller, a network interface card, or a local area network (Local Area Network, LAN) adapter. The network interface 430 is configured to receive and send a packet, and upload the received packet to the processor 410 for processing. The network interface 430 may include a plurality of ports, and the port may be any one or more of three types of interfaces: a thick-cable interface, a thin-cable interface, and a twisted pair interface.

For simplicity, definitions of path information, a first network device, a second network device, a source end, a destination end, and the like are not described in detail in this embodiment. A manner in which an SDN controller receives the path information returned by a BNG-CP device and a manner in which the SDN controller generates a detection policy for the second network device based on the path information are not described in detail. For details, refer to FIG. 2 to FIG. 7 and related descriptions.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of procedures or functions according to embodiments of this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from one web site site, computer, server, or data center to another web site site, computer, server, or data center in a wired (for example, a coaxial cable, an optical fiber, or a digital subscriber line) or wireless (for example, infrared, wireless, or microwave) manner. The computer-readable storage medium may be any usable medium that can be accessed by the computer, or a data storage device such as a server or a data center that integrates one or more usable media. The usable medium may be a magnetic medium (for example, a floppy disk, a storage disk, or a magnetic tape), an optical medium (for example, a DVD), a semiconductor medium (for example, a solid-state storage disk (Solid State Disk, SSD)), or the like.

What is claimed is:

1. A method for generating a detection policy, applied to a controller, wherein the method comprises:
   obtaining, by the controller, path information, wherein the path information comprises information about a first network device, the first network device belongs to a network device through which a packet passes from a source end to a destination end, the obtaining, by the controller, path information comprises receiving, by the controller, the path information sent from a broadband network gateway control plane (BNG-CP) device, the BNG-CP device is connected to a user plane selection function (UPSF), the UPSF is connected to the controller, and the obtaining, by the controller, path information comprises receiving, by the controller, the path information sent by the BNG-CP device via the UPSE;
   generating, by the controller, a detection policy for a second network device based on the path information; and
   delivering, by the controller, the detection policy to the second network device, wherein the second network device is the same as or different from the first network device.

2. The method according to claim 1, wherein the second network device is different from the first network device, and the method further comprises:
   determining, by the controller, information about the second network device based on the information about the first network device.

3. The method according to claim 1, wherein the second network device is different from the first network device, and the path information further comprises information about the second network device.

4. The method according to claim 1, wherein the source end is connected to a spine node via a first leaf node, the spine node is connected to a second leaf node, the second leaf node is connected to the destination end, the destination end is a broadband network gateway user plane (BNG-UP) device, and the first network device is the first leaf node.

5. The method according to claim 1, wherein the source end is connected to at least one intermediate network device via a selection function (SF) device, one network device in the at least one intermediate network device is connected to the destination end, and the destination end is a broadband network gateway user plane (BNG-UP) device; and
   the path information comprises information about the SF device.

6. The method according to claim 1, wherein the path information further comprises one or more of the following: a media access control (MAC) address of user equipment, a private internet protocol (IP) address of the user equipment, a public IP address, or a port of the user equipment.

7. The method according to claim 1, wherein the path information is carried in a detection request, and the obtaining, by the controller, path information comprises:
   receiving, by the controller, the detection request sent by a broadband network gateway control plane (BNG-CP) device; and
   obtaining the path information based on the detection request.

8. The method according to claim 1, wherein the obtaining, by the controller, path information comprises:
   receiving, by the controller, a configuration command, wherein the configuration command comprises information about first user equipment;
   sending, by the controller, a query request to a broadband network gateway control plane (BNG-CP) device based on the information about the first user equipment; and
   receiving, by the controller, the path information returned by the BNG-CP device based on the query request, wherein the path information corresponds to the first user equipment.

9. A network device, comprising one or more processors and one or more memories that are coupled to the one or more processors and store programming instructions for execution by the one or more processors to cause the network device to perform operations comprising:

obtaining path information, wherein the path information comprises information about a first network device, the first network device belongs to a network device through which a packet passes from a source end to a destination end, the obtaining path information comprises receiving the path information sent from a broadband network gateway control plane (BNG-CP) device, the BNG-CP device is connected to a user plane selection function (UPSF), the UPSF is connected to the network device, and the obtaining path information comprises receiving the path information sent by the BNG-CP device via the UPSF;

generating a detection policy for a second network device based on the path information; and delivering the detection policy to the second network device, wherein the second network device is the same as or different from the first network device.

10. The network device according to claim 9, wherein the second network device is different from the first network device, and the operations further comprise:

determine information about the second network device based on the information about the first network device.

11. The network device according to claim 9, wherein the second network device is different from the first network device, and the path information further comprises information about the second network device.

12. The network device according to claim 9, wherein the source end is connected to a spine node via a first leaf node, the spine node is connected to a second leaf node, the second leaf node is connected to the destination end, the destination end is a broadband network gateway user plane (BNG-UP) device, and the first network device is the first leaf node.

13. The network device according to claim 9, wherein the source end is connected to at least one intermediate network device via a selection function (SF) device, one network device in the at least one intermediate network device is connected to the destination end, and the destination end is a broadband network gateway user plane (BNG-UP) device; and the path information comprises information about the SF device.

14. The network device according to claim 9, wherein the path information further comprises one or more of the following: a media access control (MAC) address of user equipment, a private internet protocol (IP) address of the user equipment, a public IP address, or a port of the user equipment.

15. The network device according to claim 9, wherein the path information is carried in a detection request, and the operations further comprise:

receiving the detection request sent by a broadband network gateway control plane (BNG-CP) device; and obtaining the path information based on the detection request.

16. A network device, comprising one or more processors and one or more memories that are coupled to the one or more processors and store programming instructions for execution by the one or more processors to cause the network device to perform operations comprising:

sending path information to a controller, wherein the path information comprises information about a first network device, and the first network device belongs to a network device through which a packet passes from a source end to a destination end, the sending path information to a controller comprises sending the path information from a broadband network gateway control plane (BNG-CP) device to the controller via a user plane selection function (UPSF), the BNG-CP device is connected to the UPSF, and the UPSF is connected to the controller.

* * * * *